United States Patent [19]

Rozé et al.

[11] Patent Number: 4,659,638

[45] Date of Patent: Apr. 21, 1987

[54] ELECTROCHEMICAL STORAGE CELL

[75] Inventors: Philippe Rozé, Wiesloch-Baiertal; Guenther Steinleitner, Schriesheim, both of Fed. Rep. of Germany

[73] Assignee: Brown, Boveri & Cie AG, Mannheim, Fed. Rep. of Germany

[21] Appl. No.: 811,945

[22] Filed: Dec. 20, 1985

[30] Foreign Application Priority Data

Dec. 21, 1984 [DE] Fed. Rep. of Germany ....... 3446779

[51] Int. Cl.$^4$ .......................................... H01M 10/39
[52] U.S. Cl. ................................... 429/104; 429/209
[58] Field of Search ............................... 429/104, 209

[56] References Cited

U.S. PATENT DOCUMENTS

| | | | |
|---|---|---|---|
| 4,127,634 | 11/1978 | Joo | 429/104 |
| 4,146,684 | 3/1979 | Fischer et al. | 429/104 |
| 4,269,909 | 5/1981 | King et al. | 429/104 |
| 4,515,874 | 5/1985 | Steinleitner | 429/104 |
| 4,530,151 | 7/1985 | Kagawa et al. | 429/104 |
| 4,564,568 | 1/1986 | Hasenauer et al. | 429/104 |

Primary Examiner—Donald L. Walton
Attorney, Agent, or Firm—Herbert L. Lerner; Laurence A. Greenberg

[57] ABSTRACT

Electrochemical storage cell of the sodium and sulfur type with an anode space and a cathode space which are separated from each other by a solid electrolyte and are bounded at least in places, by a metallic housing, with the cathode space for forming the sulfur electrode, filled with fiber material of graphite or carbon which is saturated with sulfur. A defined ratio of the value p of the thickness ($d_S$) of the sulfur electrode to the wall thickness ($d_K$) of the solid electrolyte is fixed.

3 Claims, 2 Drawing Figures

ELECTROCHEMICAL STORAGE CELL

BACKGROUND OF THE INVENTION

1. Field of the Invention

The invention relates to an electrochemical storage of the sodium and sulfur type with an anode space and a cathode space which are separated from each other by a solid electrolyte and are bounded at least in places, by a metallic housing, with the cathode space filled with fiber material of graphite or carbon which is saturated with sulfur for forming the sulfur electrode.

2. Description of the Prior Art

Such electrochemical storage cells are highly suited as energy sources. They find increasing use in the construction of storage batteries which are provided as a power supply of electric vehicles.

A specific example of these storage cells are those of the sodium and sulfur type which are rechargeable and have a solid electrolyte of beta aluminum oxide which separates the anode space from the cathode space. It should be pointed out as an advantage of these storage cells that no electrochemical secondary reactions proceed while they are being charged and the current yield is therefore near 100%. In such storage cells, the anode space contains sodium within the cup-shaped solid electrolyte. The cathode space is situated between the solid electrolyte and the metallic housing which defines the storage cells toward the outside. In the storage cells known to date, there is arranged within the cathode space a long-fiber material of graphite or carbon that is saturated with sulfur for forming the sulfur electrode. In the manufacture of the storage cells, elements in the form of half shells are formed from the fiber-shaped material, are impregnated with sulfur and then inserted into the cathode space. The storage cells are fabricated at room temperature. For operation, the storage cells are heated to a temperature of about 350° C. A storage cell subjected to such a temperature influence causes the fiber material therein to expand, particularly that of the two half shells which are arranged in the cathode space. They expand to the extent that their end faces abut flush against each other and the fibers of the one half extend into the fibers of the other half, so that there is no longer any space in the boundary region of the half shells. When the storage cells are discharged, the sodium ions contained in the anode space migrate through the solid electrolyte into the cathode space and there form with the sulfur present the sodium polysulfide. Due to the fact that the two half shells formed of the long-fiber material now are in close contact with each other, the sodium polysulfide can distribute itself uniformly, including particularly over the boundary surfaces of the two half shells in the cathode space. If such a storage cell containing large amounts of sodium polysulfide in the cathode space is cooled down, the sodium polysulfide solidifies and forms a closed ring which firmly surrounds the solid electrolyte. Sodium polysulfide has a higher thermal coefficient of expansion than beta aluminum oxide, of which the solid electrolyte is made. This means that the ring of long-fiber material containing the sodium polysulfide shrinks onto the solid electrolyte when it cools down. Thereby, such long-fiber-sodium polysulfide impregnated ring adheres very strongly on the outside surfaces of the solid electrolyte and with declining temperature, exerts forces on the same, which is caused by the different thermal expansion coefficients of the two materials. These shearing forces can lead in due time to the formation of cracks in the solid electrolyte and thereby to the destruction of the entire storage cell.

SUMMARY OF THE INVENTION

It is an object of the invention to provide an electrochemical storage cell, in which the action of destructive forces on the solid electrolyte due to fiber impregnated with sodium polysulfide around the solid electrolyte are permanently prevented.

With the foregoing and other objects in view, there is provided in accordance with the invention an electrochemical storage cell of the sodium and sulfur type with an anode space and a cathode space which are separated from each other by a solid electrolyte and are bounded at least in places, by a metallic housing with the cathode space filled with fiber material of graphite or carbon which is saturated with sulfur for forming a sulfur electrode, the improvement comprising fixing a ratio of a thickness ($d_S$) of the sulfur electrode to a wall thickness ($d_K$) of the solid electrolyte to a value p between 2 and 10.

Other features which are considered as characteristic for the invention are set forth in the appended claims.

Although the invention is illustrated and described herein as embodied in an electrochemical storage cell, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings in which.

DESCRIPTION OF THE PREFERRED EMBODIMENTS

Figure 1:
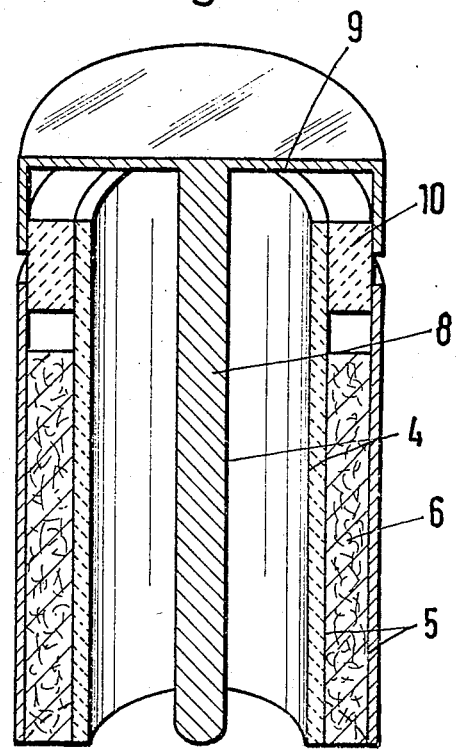
FIG. 1 illustrates a vertical section of an upper portion and a lower portion of an electrochemical storage cell in accordance with the invention wherein the cathode space contains the sulfur electrode which is made of a felt or fiber-shaped material of carbon or graphite. The ratio of the thickness $d_s$ of the sulfur electrode to the wall thickness $d_k$ of the solid electrolyte has a defined value p.
Figure 1:
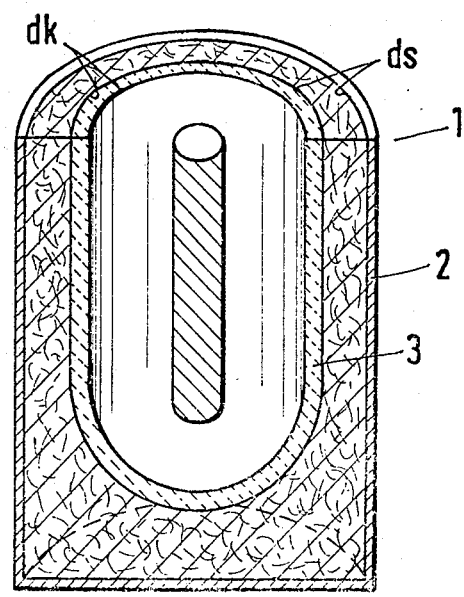

In order to keep the bothersome shear forces away from the solid electrolyte of the storage cell, the ratio p of the thickness $d_s$ of the sulfur electrode and the walls thickness $d_k$ of the solid electrolyte is chosen so that this value p is between 2 and 10 and preferably between 3 and 5. According to the invention, the sulfur electrode is designed to have a breaking strength of at most 40 MPa and preferably 15 MPa. In the region of the lateral boundary surfaces of the solid electrolyte, the sulfur electrode is divided into two and preferably more sectors. These extend parallel to the longitudinal axis of the solid electrolyte and extend along the entire lateral boundary of the solid electrolyte. The sulfur electrode is made of a fiber-shaped material of the graphite or carbon type, and the fiber length of the material is at most ¼ to ¾ of the width of the sulfur electrode. According to the invention, the material forming the sulfur electrode has a particular size which corresponds approximately to one-half the thickness of the sulfur electrode. In order to obtain a sulfur electrode in a simple manner, the mats, preferably of the long-fiber material of graphite or carbon used heretofore, are impregnated with sulfur, pressed and subsequently ground. Thereby, the size of the material desired for the sulfur electrode is obtained. The particles so obtained are subsequently filled into the cathode space. In the charge state of the storage cell, such a sulfur electrode has a porosity of 10 to 50%. The pore size of the material forming the sulfur electrode is about 0.5 to 2 mm. The solid electrolyte is preferably made of a beta aluminum oxide which has a breaking strength of more than or equal to 100 MPa. By the measures described above, the tearing and tensile strength of the sulfur electrode is lowered to about 30% of the value exhibited by the sulfur electrodes with the conventional design.

In place of the material described above, two half shells which form the sulfur electrode can be placed in the cathode space. These half shells are made of the same material as the above-described sulfur electrode. To this end, the fiber-shaped material of carbon or graphite felt is impregnated with sulfur and subsequently pressed as a half shell. Before they are inserted, the half shells are divided into sections by cutting or sawing.

All embodiment examples of the storage cell according to the invention have the advantage that the stable tear-proof fiber assembly of the graphite or carbon felt is no longer present in the so-designed sulfur electrode in comparison with the known embodiments, so that the shear forces originating from the fiber material and the sodium polysulfide are reduced to a minimum which no longer is effective to break the solid electrolyte. Thereby, a storage cell is created which can be cycled better. In the fabrication of a sulfur electrode which is formed by small fiber particles, cheap materials such as mats of pitch fibers can be processed. The tensile strength of the sulfur electrode is reduced drastically by pores between the fiber particles which form in the sulfur electrode. If pressed half-shells are used instead of the fiber particles, the tear strength is likewise reduced by cutting the half shells to at least a depth of 50% of their thickness to an extent that destructive shear forces no longer occur. In a storage cell with this sulfur electrode, the ability to cycle is likewise improved.

In all embodiments, the electric resistance of a storage cell is as low as in the storage cells known heretofore, in which the sulfur electrodes are formed by half shells which, however, are not cut.

The invention will be explained in the following making reference to the drawings.

The storage cell 1 shown in FIG. 1 is bounded to the outside by a metallic housing 2 which is cup-shaped in the embodiment example shown here. The inside surfaces of a metallic housing 2 are coated with corrosion protection, not shown here. The solid electrolyte 3, also cup-shaped, is arranged in the interior of the metallic housing 2. Solid electrolyte 3 is made of a beta aluminum oxide which has a breaking strength of more than or equal to 100 MPa. The interior of the electrolyte 3 serves as the anode space 4 which in this storage cell is filled with sodium. The dimensions of the solid electrolyte 3 are chosen such that a coherent space remains between its outside surfaces and the inside surfaces of the metallic housing 2. The coherent space serves as the cathode space 5. The cathode space 5 contains the sulfur electrode 6 which is made of a felt or a fiber-shaped material of the graphite or carbon type. The thickness $d_s$ of the sulfur electrode 6 is chosen such that the sulfur electrode directly adjoins the inside surface of the metallic housing 2 and the outside surface of the solid electrolyte 3. The thickness $d_s$ of the sulfur electrode forms, with the wall thickness $d_K$ of the solid electrolyte 3 a ratio which has a defined value p, i.e. $p=d_s/d_k$. In the embodiment example shown here, this ratio has a value p=4. For forming the sulfur electrode 6, a felt or fiber-shaped material is used which is made of graphite or carbon. The particles of the material filled into the cathode space 5 have a size which is between ¼ and ¾ the thickness of the sulfur electrode. Preferably, the material filled into the cathode space has a particle size which corresponds to one-half the thickness of the sulfur electrode. The material filled into the cathode space 5 for forming the sulfur electrode is pressed before it is filled in, impregnated with sulfur and subsequently ground so that the particles have the above-described size.

The material forming the sulfur electrode is filled into the cathode space such that it directly adjoins the solid electrolyte 3 as well as the metallic housing 2. Thus, close contact between the sulfur electrode and the metallic housing or the solid electrolyte, respectively, is provided everywhere. The material is filled into the cathode space with a density such that in the charge state of the storage cell, the sulfur electrode 6 has a porosity between 10 and 50%. The pores have a pore size of 0.5 to 2 mm. The dimensions of the storage cell 1, particularly of the cathode space and the wall thickness of the solid electrolyte are chosen to relate the thickness $d_S$ of the sulfur electrode 6 and the wall thickness $d_k$ of the solid electrolyte 3 to obtain a ratio with a value p which is between 3 and 5. In the storage cell 1 shown in FIG. 1, the metallic housing 2 serves as the cathodic current collector, while a current collector 8 in rod form extends into the anode space 4 and is connected in an electrically conducting manner to the closing cap 9 of the storage cell 1. At its upper open end, the solid electrolyte 3 is provided with an annular outward-pointing flange which is firmly connected to the inside surfaces of the metallic housing 2. The width of the flange 10 is made to completely cover the cathode space between the solid electrolyte 3 and the metallic housing 2 and this space is sealed gas-tight to the outside by the firm connection of the flange 10 to the metallic housing 2. The sealing cap 9 of the storage cell 1 is placed upside down over the flange 10 and is permanently connected to the latter, so that the storage cell 1 is thereby firmly closed to the outside.

Figure 2:
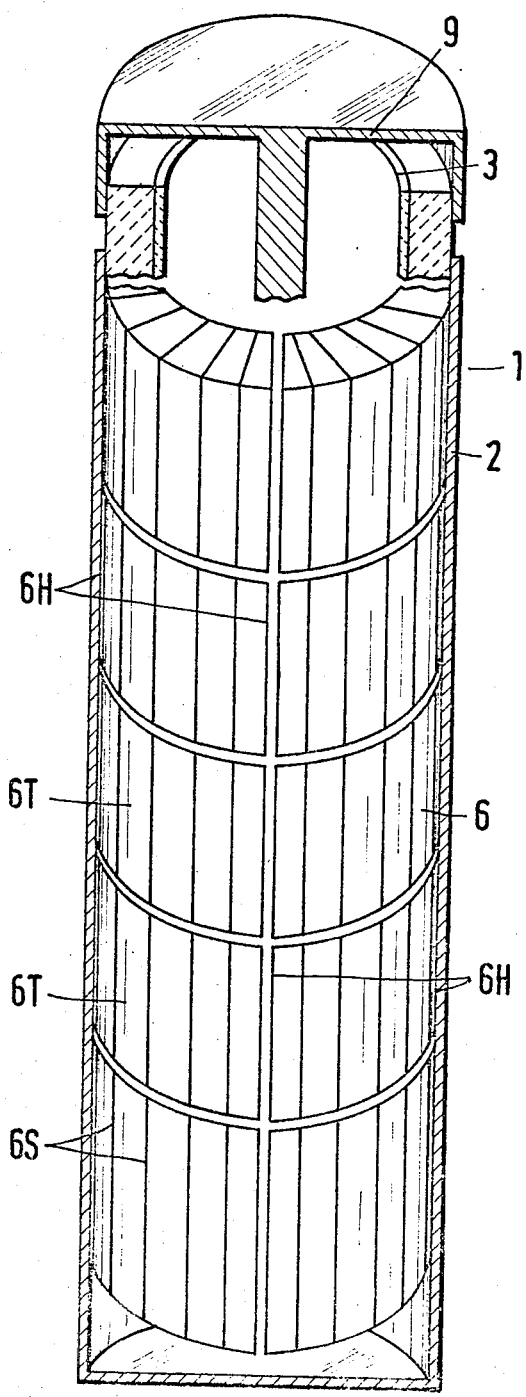
FIG. 2 is a variant of the storage cell shown in FIG. 1 and shows a sulfur electrode in the shape of two spaced half shells conforming to the contour of the solid electrolyte. These shells are subdivided into sections spaced from one another.

The variant of the storage cell according to the invention shown in FIG. 2 differs from the embodiment shown in FIG. 1 with respect to the specific design of the cathode space 5. Like parts are therefore provided with the same reference symbols. To the outside, the storage cell 1 is bounded by a metallic housing 2, in the interior of which the solid electrolyte 3 is arranged. The cathode space 5 which contains the sulfur electrode 6 is between the solid electrolyte 3 and the metallic housing 2. Sulfur electrode 6 is formed in the embodiment shown here by two half shells 6H, which consist of a fiber-shaped material made of carbon or graphite. The shapes of the two half shells are matched to the contour of the solid electrolyte. The amount of the fiber-like material used for making the half-shells 6H is chosen such that after they are finished and particularly pressed, the half shells have a thickness $d_S$. In particular, the thickness of the two half shells is chosen that the half shells adjoin the solid electrolyte as well as the metallic housing of the storage cell and completely fill the cathode space. For fabricating the half shells, the above-mentioned fiber-shaped material is first impregnated with sulfur and subsequently pressed into the desired half shells which enclose the solid electrolyte on its outside completely by these the two half shells. In order to avoid the destruction of the solid electrolyte by a ring of sodium polysulfide when the storage cell cools down, the graphite felt is subdivided before or after the saturation with sulfur and the subsequent pressing, by cutting or sawing into the half shell material, into sections 6T. Preferably, sections 6T are formed with longitudinal axes which extend parallel to the longitudinal axis of the solid electrolyte. Cuts are made in each half shell which extend parallel to its longitudinal axes and are arranged at a defined spacing from each other. Preferably, each section has a height of at least 20 mm. This lengthwise division is followed by a sectional surface 6S which extends perpendicularly to the longitudinal axis of the solid electrolyte, by which the above-formed sections 6T of the half shells are bounded. This sectional surface 6S extending perpendicularly to the longitudinal axis of the solid electrolyte, is followed again by several sectional surfaces extending parallel to the longitudinal axis of the solid electrolyte in the radial direction, whereby further sections within the region of each half shell are formed. In this manner, each half shell is subdivided all around and in regions which are arranged perpendicularly to each other. By virtue of this subdivision of the half shells, no closed ring of sodium polysulfide can form around the solid electrolyte when the storage cell cools off. Thereby, the shear forces originating from this ring are prevented and the durability of the solid electrolyte 3 is increased. The subdivision of the half shell 6H is not tied to the embodiment described above. Rather, any subdivision is possible by which the formation of a sodium polysulfide ring is prevented. The half shells are impregnated with sulfur and pressed in to have a porosity between 10 and 50% in the charged state of the storage cell. Also, in these half shells, the pores have a size of 0.5 to 2 mm. The dimensions of the storage cell 1 particularly of the cathode space 5 and the sulfur electrode 6 are also here chosen to have a ratio of the value p of wall thickness of the solid electrolyte $d_K$ to the thickness of the sulfur electrode $d_S$ which is between 2 and 5.

The foregoing is a description corresponding, in substance, to German application No. P 34 46 779.3, dated Dec. 21, 1985, international priority of which is being claimed for the instant application and which is hereby made part of this application. Any material discrepancies between the foregoing specification and the specification of the aforementioned corresponding German application are to be resolved in favor of the latter.

There is claimed:

1. Electrochemical storage cell of the sodium and sulfur type with an anode space and a cathode space which are separated from each other by a solid electrolyte and are bounded at least in places, by a metallic housing with the cathode space, which contains the sulfur electrode, formed of fiber-shaped material of graphite or carbon saturated with sulfur pressed and subsequently ground with a particle size which corresponds to $\frac{1}{4}$ to $\frac{3}{4}$ of the thickness ($d_S$) of the sulfur electrode, which is formed by at least two half shells which are shaped to conform to the outer shape of the solid electrolyte, pressed and subdivided at least in regions into a large number of sections by cutting and/or sawing, and the ratio of the thickness ($d_S$) of the sulfur electrode to the wall thickness ($d_K$) of the solid electrolyte has a value p between 3 and 5, and the sulfur electrode has a breaking strength of at most 40 MPa, a porosity of 10 to 50% and a pore size of 0.2 to 2 mm.

2. Electrochemical storage cell of the sodium and sulfur type with an anode space and a cathode space which are separated from each other by a solid electrolyte and are bounded at least in places, by a metallic housing with the cathode space, which contains the sulfur electrode, formed of fiber-shaped material of graphite or carbon saturated with sulfur pressed and subsequently ground with a particle size which corresponds to $\frac{1}{4}$ to $\frac{3}{4}$ of the thickness ($d_S$) of the suflur electrode, which is formed by at least two half shells which are shaped to conform to the outer shape of the solid electrolyte, pressed, and cuts made in the half shells of carbon or graphite felt, which cuts have a depth which corresponds to at least 50% of the thickness of the half shells, and the ratio of the thickness ($d_S$) of the sulfur electrode to the wall thickness ($d_K$) of the solid electrolyte has a value p between 3 and 5, and the sulfur electrode has a breaking strength which is below 15 MPa, a porosity of 10 to 50% and a pore size of 0.2 to 2 mm.

3. Electrochemical storage cell of the sodium and sulfur type with an anode space and a cathode space which are separated from each other by a solid electrolyte and are bounded at least in places, by a metallic housing with the cathode space, which contains the sulfur electrode, formed of fiber-shaped material of graphite or carbon saturated with sulfur pressed and subsequently ground with a particle size which corresponds to $\frac{1}{2}$ of the thickness ($d_S$) of the sulfur electrode, which is formed by at least two half shells which are shaped to conform to the outer shape of the solid electrolyte, pressed, and cuts made in the half shells of carbon or graphite felt, which cuts have a depth which corresponds to at least 50% of the thickness of the half shells, and the ratio of the thickness ($d_S$) of the sulfur electrode to the wall thickness ($d_K$) of the solid electrolyte has a value p between 3 and 5, and the sulfur electrode has a breaking strength which is below 15 MPa, a porosity of 10 to 50% and a pore size of 0.2 to 2 mm.

* * * * *